(12) United States Patent
Kim

(10) Patent No.: US 8,439,377 B2
(45) Date of Patent: May 14, 2013

(54) STRUCTURE OF ROLL ROD FOR VEHICLE

(75) Inventor: Hyo-Seok Kim, Kwangmyung-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 4 days.

(21) Appl. No.: 13/194,420

(22) Filed: Jul. 29, 2011

(65) Prior Publication Data

US 2012/0056395 A1 Mar. 8, 2012

(30) Foreign Application Priority Data

Sep. 3, 2010 (KR) .......................... 10-2010-0086484

(51) Int. Cl.
*B62D 21/11* (2006.01)
*B60K 5/12* (2006.01)

(52) U.S. Cl.
USPC ................................... 280/124.109; 280/788

(58) Field of Classification Search .................. 180/291, 180/299, 300, 312, 377; 248/559, 606, 635, 248/638, 647, 674, 675; 267/140.12, 140.2, 267/140.3, 140.4, 141.1, 141.2, 141.3, 279–283, 267/292–293; 280/781, 788, 124.109
See application file for complete search history.

(56) References Cited

U.S. PATENT DOCUMENTS

| | | | | |
|---|---|---|---|---|
| 2,958,526 A | * | 11/1960 | Ulderup et al. | 267/292 |
| 3,730,462 A | * | 5/1973 | Dick | 267/140.2 |
| 4,610,420 A | * | 9/1986 | Fukushima et al. | 248/550 |
| 4,901,814 A | * | 2/1990 | von Broock et al. | 180/297 |
| 5,037,058 A | * | 8/1991 | Kojima et al. | 248/562 |
| 5,158,271 A | * | 10/1992 | Hein | 267/281 |

(Continued)

FOREIGN PATENT DOCUMENTS

| | | |
|---|---|---|
| JP | 06-008255 A | 1/1994 |
| JP | 06-129459 A | 5/1994 |
| JP | 11-013825 A | 1/1999 |
| KR | 100535098 B1 | 12/2005 |
| KR | 1020070111158 A | 11/2007 |

OTHER PUBLICATIONS

Frame Definition, Cambridge Dictionary of American English, available at, http://dictionary.cambridge.org/dictionary/american-english/frame_2 (last visited on Sep. 27, 2012).*

*Primary Examiner* — Joseph Rocca
(74) *Attorney, Agent, or Firm* — Morgan, Lewis & Bockius LLP

(57) ABSTRACT

Provided is a structure of a roll rod for a vehicle which is mounted on a subframe of the vehicle and combined with a transmission or an engine. The structure includes a fastening rod having one end connected with the transmission or the engine and the other end where a sliding portion is inserted in the subframe, a mounting member fixed to the subframe in contact with the outer circumference of the sliding portion and having a protrusion on the inner circumference, a front insulator connected to the outer circumference of the sliding portion and positioned ahead of the protrusions, a rear insulator connected to the outer circumference of the sliding portion and positioned behind the protrusion, and an end plate mounted on the fastening rod, behind the rear insulator, in which the rear insulator is formed by combining two or more sub-insulators and one or more sub-insulators are spaced apart from the end plate. The structure allows efficiently carrying displacement of the power train and insulate vibration and preventing the rear insulators from being worn and broken, thereby improving durability.

6 Claims, 5 Drawing Sheets

U.S. PATENT DOCUMENTS

| | | | | |
|---|---|---|---|---|
| 5,364,061 A | * | 11/1994 | Ciolczyk et al. | 248/610 |
| 6,729,430 B2 | * | 5/2004 | Adams et al. | 180/300 |
| 7,306,208 B2 | * | 12/2007 | Hwang | 267/140.13 |
| 2006/0043654 A1 | * | 3/2006 | Allaei | 267/140.3 |

* cited by examiner

Fig. 1a
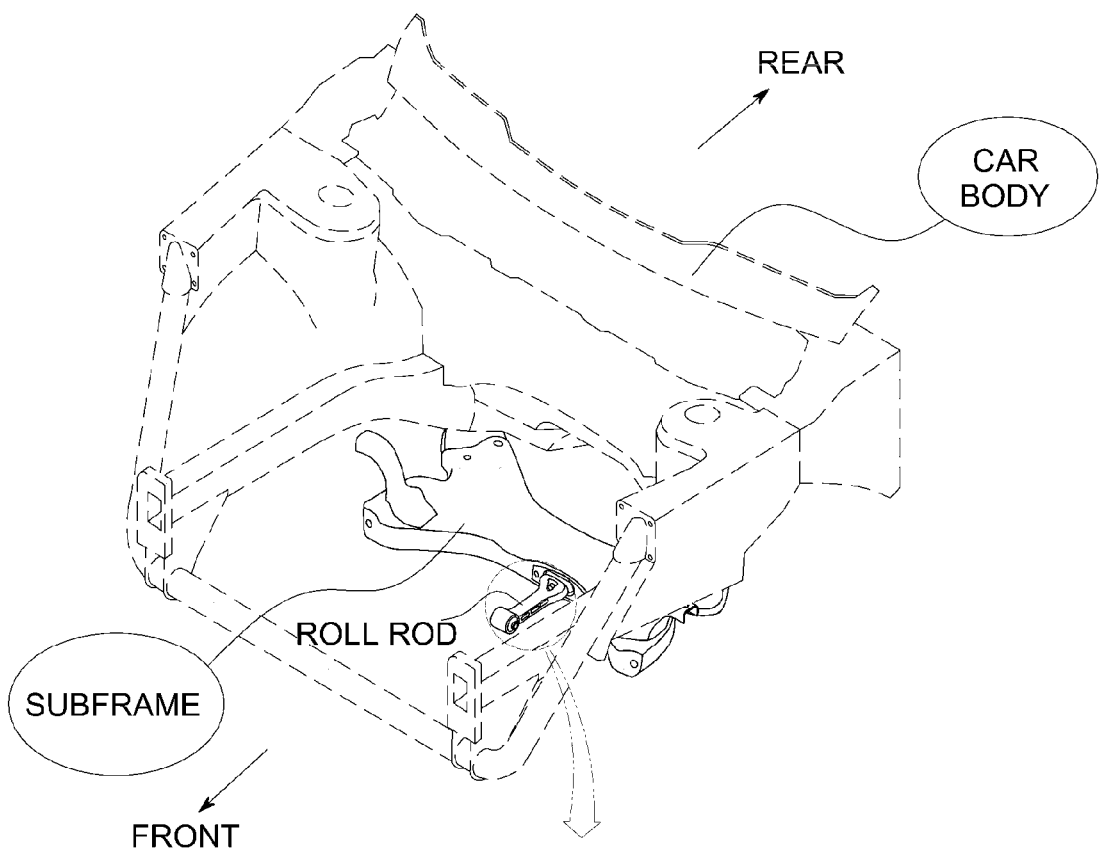
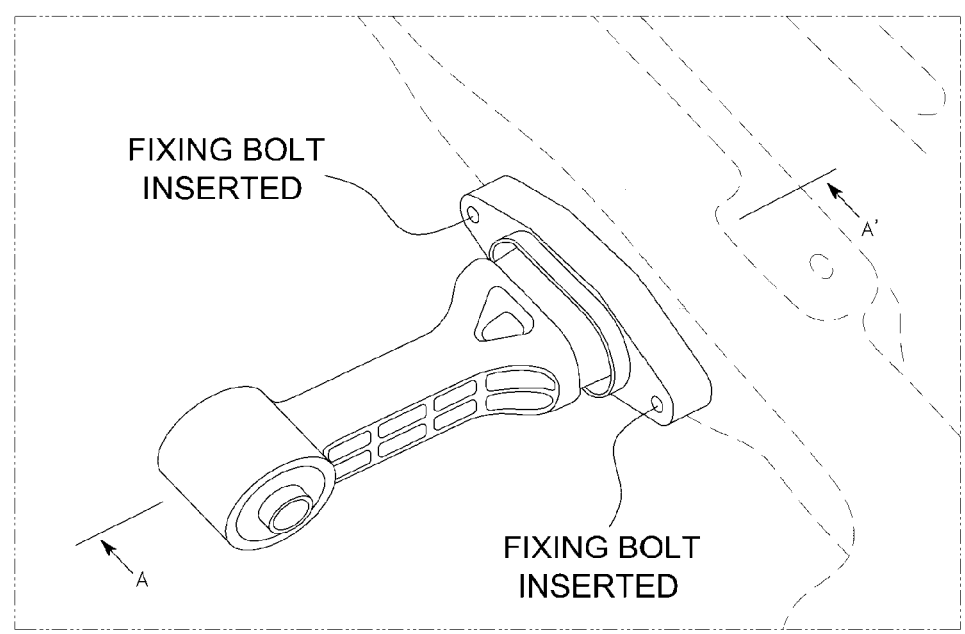

------- REAR INSULATOR APPLIED TO ROLL ROD STRUCTURE OF THE RELATED ART
— — — REAR INSULATOR FORMED BY COMBINING TWO SUB-INSULATORS IN ACCORDANCE WITH THE PRESENT INVENTION

STRUCTURE OF ROLL ROD FOR VEHICLE

CROSS-REFERENCE TO RELATED APPLICATIONS

The present application claims priority of Korean Patent Application Number 10-2010-86484 filed Sep. 3, 2010, the entire contents of which application is incorporated herein for all purposes by this reference.

BACKGROUND OF INVENTION

1. Field of Invention

The present invention relates to a structure of a roll rod for a vehicle, and more particularly, to a structure of a roll rod for a vehicle which has improved durability and vibration insulation by improving the structure of a rear insulator repeatedly receiving large load.

2. Description of Related Art

A monocoque body that is light and has high productivity is generally used in vehicles, instead of a frame body. A specific frame is removed and a power train including an engine is directly mounted on the car body, in the monocoque body. Therefore, in the monocoque body, the car body itself functions as a frame and a suspension and chassis parts are mounted, but a subframe is mounted at the lower portion of the vehicle in order to prevent vibration of the power train (a mechanism composed of the engine, transmission, and differential gear) from being directly transmitted to the car body and distribute shock in a collision.

The subframe is manufactured in various shapes in accordance with the power and size of the vehicles, while the power train having a high-exhaust and high-torque engine generally uses a subframe having a #-shape composed of four bars arranged in a rectangular.

Further, in a relatively low-exhaust and low-torque engine, as shown in FIG. 1A, a subframe, which is fixed to the car body, has a plate shape where a steering system is mounted, and allows a suspension strut and a knuckle to be connected, is mounted.

Mounting members support at three positions in vehicles equipped with the plate-shaped subframe. That is, an engine mount and a transmission mount are mounted at both sides of the car body and carry the weight of the power train while the roll rod mounted on the subframe controls displacement of the power train and attenuates vibration.

The roll rod is mounted on the subframe by fixing bolts and the detailed configuration is shown in FIG. 1B.

Referring to FIG. 1B, the roll rod includes a fastening rod 10, a mounting member 20, and insulators 50, 60. The fastening rod 10 has a bar shape, in which a rubber bush 13 connected to the transmission is mounted at the end of the portion protruding from the subframe and a sliding portion 11 having a pipe shape is formed at the portion inserted in the subframe. The mounting member 20 fastening the fastening rod 10 to the subframe is fitted on the sliding portion 11. Further, a protrusion 12 is formed at one end of the sliding portion 11 to prevent the mounting member 20 from separating from the sliding portion 11, an end plate 30 is connected to the other end, and a protrusion 21 is formed on the inner circumference of the mounting member. Further, the front insulator 50 and the rear insulator 60 are mounted ahead of and behind the protrusions 21, respectively, on the sliding portion 11. Meanwhile, the end plate 30 is fixed by a bolt 40 passing through the sliding portion 11 and a nut 41 thread-fastened on the bolt 40.

Therefore, the rear insulator 60 is compressed and functions as a damper in accordance with displacement of the power train due to the inertia, when the vehicle moves forward, while the front insulator 50 is compressed and functions as a damper, when the vehicle moves backward or reduces the speed.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

However, vibration and excessive displacement which are generated when a vehicle is started or accelerated or the gear is shifted are exerted as continuous mechanical stress in the insulators. In particular, the rear insulator where sudden load is more frequently applied is likely to be worn and broken by friction and press due to the end plate.

Various aspects of the present invention provide for a structure of a roll rod for a vehicle.

Various aspects of the present invention provide a structure of a roll rod for a vehicle which is mounted on a subframe of the vehicle and combined with a transmission or an engine, including a fastening rod having one end connected with the transmission or the engine and the other end where a sliding portion is inserted in the subframe, a mounting member fixed to the subframe in contact with the outer circumference of the sliding portion and having a protrusion on the inner circumference, a front insulator connected to the outer circumference of the sliding portion and positioned ahead of the protrusions, a rear insulator connected to the outer circumference of the sliding portion and positioned behind the protrusion, and an end plate mounted on the fastening rod, behind the rear insulator, in which the rear insulator is formed by combining two or more sub-insulators and one or more sub-insulators are spaced apart from the end plate.

Further, the sub-insulators may be formed in a ring shape fitted in the sliding portion and the edges of the contact surfaces facing each other are rounded or inclined to form a V-shaped or U-shaped groove.

Further, the sub-insulators may be made of materials having different hardness or stiffness, and the sub-insulator at the rearmost position has stiffness larger than the other sub-insulators.

Further, the sub-insulators may be implemented by two sub-insulators and the sub-insulator positioned at the front portion has a thickness that is the same or larger than the thickness of the sub-insulator positioned at the rear portion, in order to ensure efficient vibration insulation.

According to various aspects of the present invention, it is possible to more efficiently carry displacement of the power train and insulate vibration and prevent the rear insulators from being worn and broken, thereby improving durability.

Further, it is possible to make the design of the roll rod more free in accordance with features of the vehicle by using different kinds of sub-insulators.

Further, a V-shaped or U-shaped groove is formed around the contact surface to allow the sub-insulators to be elastically deformed.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1A is a perspective view showing the position where a roll rod is mounted.

DETAILED DESCRIPTION

Figure 1B:
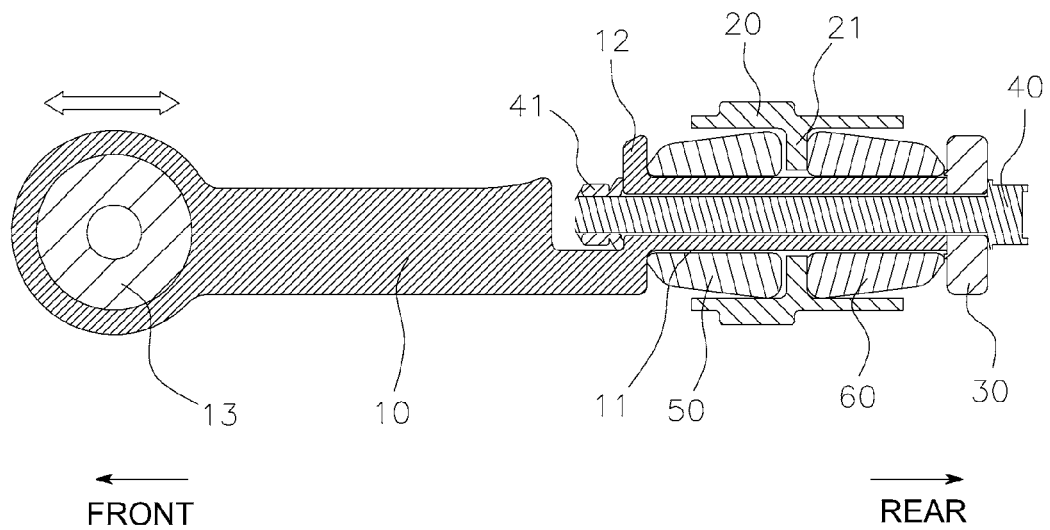
FIG. 1B is a cross-sectional view taken along the line A-A' of FIG. 1A.
Figure 2:
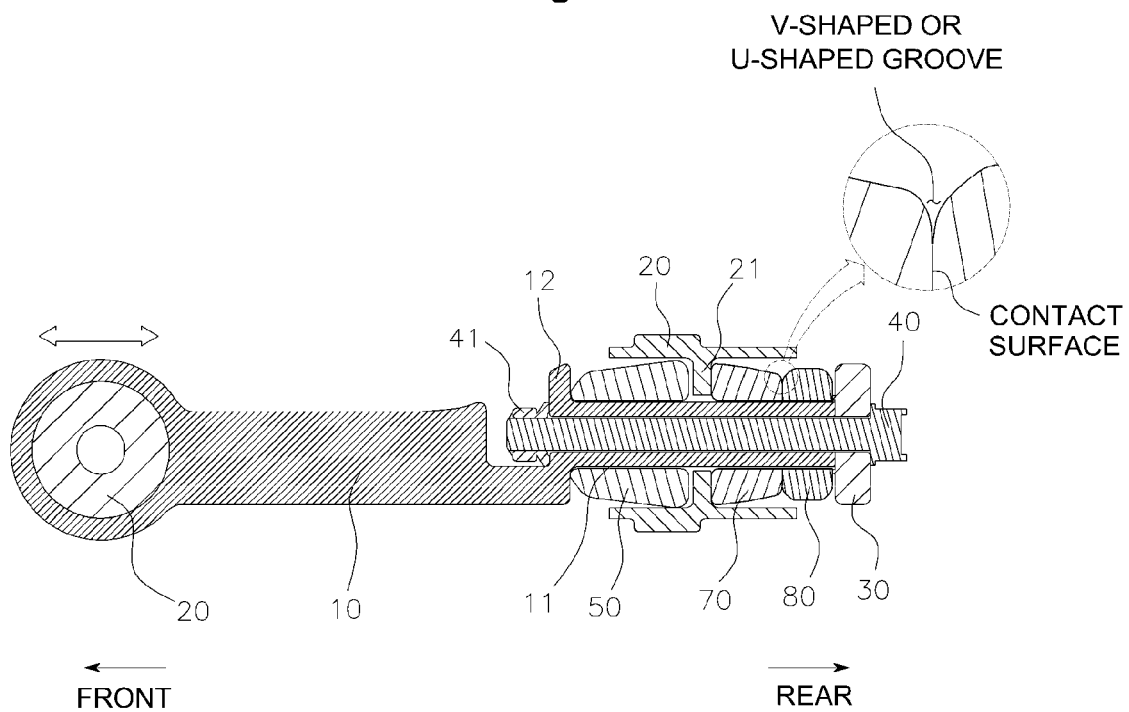
FIG. 2 is a cross-sectional view of an exemplary roll rod for a vehicle according to the present invention.
Figure 3:
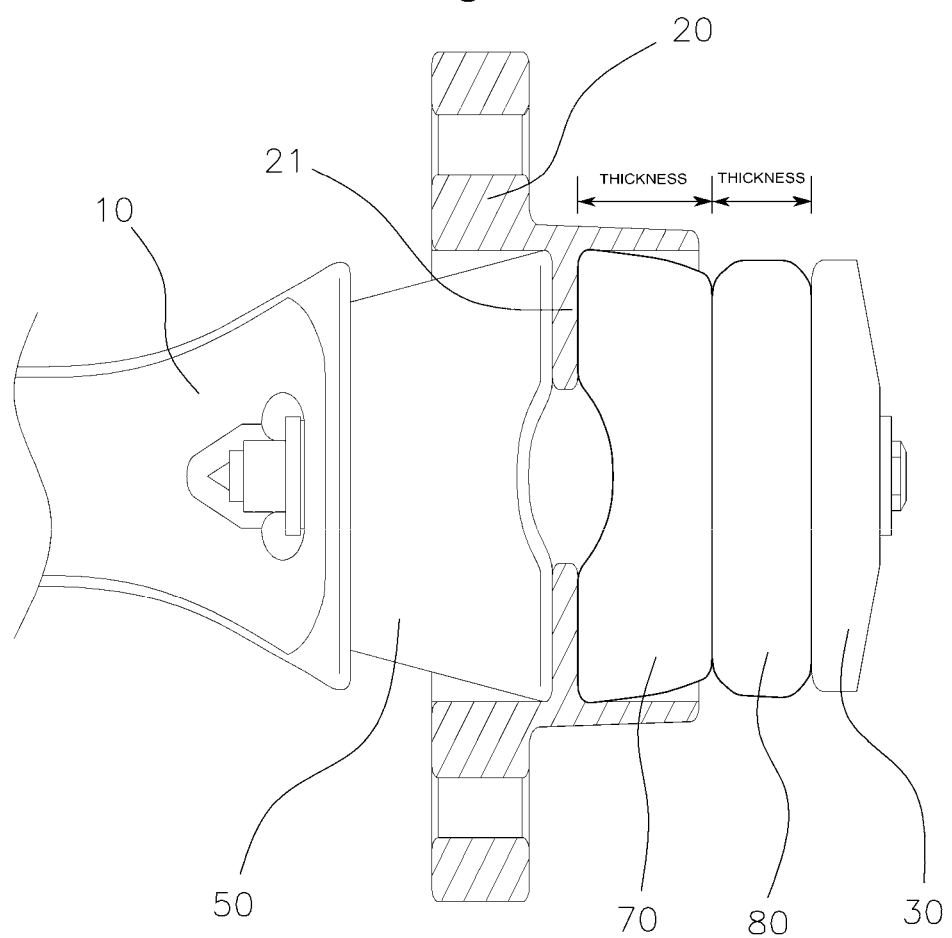
FIG. 3 is a plan view with an exemplary mounting member partially cut in the roll rod for a vehicle according to the present invention to show a sub-insulator mounted therein.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to the figures, a roll rod of the present invention is characterized in that a rear insulator is formed by combining two or more sub-insulators.

That is, similar to the structures in the related art, a fastening rod 10 connects a subframe with the lower portion of a transmission, a mounting member 20 fixes the fastening rod 10 to the subframe, a front insulator 50 and the rear insulator are elastically deformed by forward/backward movement of the fastening rod, and the rear insulator allows ring-shaped sub-insulators are in surface contact.

Further, assuming that the sub-insulator being in contact with a protrusion 21 is a first sub-insulator 70 and the sub-insulator being in contact with an end plate 30 is a second sub-insulator 80 in the figures, the edges of the contact surfaces of the first sub-insulator 70 and the second sub-insulator 80 which face each other is rounded to provide a space in elastic deforming, or inclined to form a V-shaped or U-shaped groove.

Further, the first insulator 70 and the second insulator 80 may be made of materials having different hardness. For example, a combination of synthetic rubbers having different stiffness or a combination of synthetic rubber with synthetic resin, such as polyurethane, may be used.

Further, the first sub-insulator 70 may be thicker than the second sub-insulator 80 and the second sub-insulator 80 may be made of a material having stiffness larger than the first sub-insulator 70.

The combination of the first sub-insulator 70 and the second sub-insulator 80 allows the first sub-insulator 70 to sufficiently insulate vibration from the engine and the second sub-insulator 80 having larger stiffness to increase abrasion resistance due to close-contact press with the end plate 30.

Figure 4:
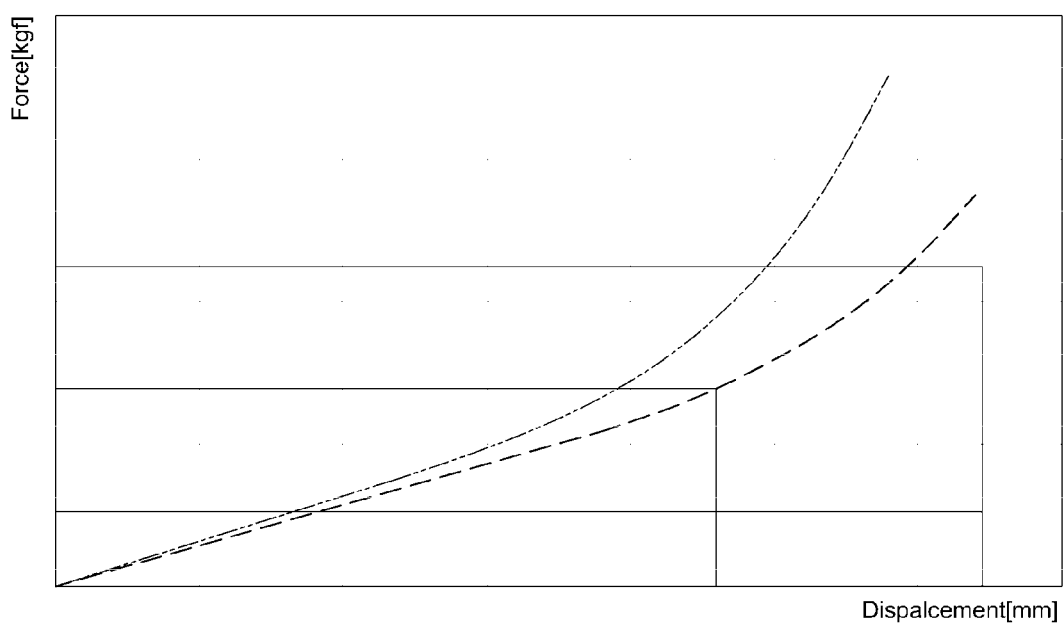
FIG. 4 is a graph of data values obtained by a comparative experiment of roll rods using a rear insulator of the related art and an exemplary rear insulator of the present invention.

FIG. 4 is a graph of data values obtained by a comparative experiment of roll rods using a rear insulator of the related art and a rear insulator of the present invention. The horizontal axis shows displacement (of the fastening rod) and the vertical axis shows force exerted in the rear insulator. The rear insulator of the present invention allows the fastening rod to further move under the same load. That is, the insulator of the related art has a limit in selecting the material in consideration of abrasion with the end plate; however, the rear insulator of the present invention makes it possible to use a material having smaller stiffness for the first sub-insulator, such that it is possible to use a material that is more suitable for the requirements for vibration insulation and to make the design free in accordance with the features of a vehicle.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A structure of a roll rod for a vehicle which is mounted on a subframe of the vehicle and combined with a transmission or an engine, the structure comprising:
   a fastening rod having one end connected with the transmission or the engine and another end where a sliding portion is inserted in the subframe;
   a mounting member fixed to the subframe in contact with an outer circumference of the sliding portion and having a protrusion on an inner circumference;
   a front insulator connected to the outer circumference of the sliding portion and positioned ahead of the protrusion;
   a rear insulator connected to the outer circumference of the sliding portion and positioned behind the protrusion; and
   an end plate mounted on the fastening rod, behind the rear insulator, wherein the rear insulator is formed by combining two or more sub-insulators, and wherein one or more of the sub-insulators are spaced apart from the end plate.

2. The structure of the roll rod for the vehicle according to claim 1, wherein the sub-insulators have edges including respective contact surfaces and are formed in a ring shape fitted around the sliding portion, wherein a groove is formed between the edges of the respective contact surfaces where the edges of the respective contact surfaces face one another.

3. The structure of the roll rod for the vehicle according to claim 2, wherein the groove is V-shaped or U-shaped.

4. The structure of the roll rod for the vehicle according to claim 1, wherein the sub-insulators are made of materials having different hardness or stiffness.

5. The structure of the roll rod for the vehicle according to claim 4, wherein the sub-insulator at the rearmost position has stiffness larger than the other sub-insulators.

6. The structure of the roll rod for the vehicle according to claim 5, wherein the sub-insulators are implemented by two sub-insulators and the sub-insulator positioned at the front portion has a thickness that is the same or larger than the thickness of the sub-insulator positioned at the rear portion.

* * * * *